United States Patent
Kurokawa et al.

(10) Patent No.: US 12,263,783 B2
(45) Date of Patent: Apr. 1, 2025

(54) VEHICLE CONTROL SYSTEM

(71) Applicant: Mazda Motor Corporation, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 653 days.

(21) Appl. No.: 17/631,501

(22) PCT Filed: Jul. 21, 2020

(86) PCT No.: PCT/JP2020/028184
§ 371 (c)(1),
(2) Date: Jan. 31, 2022

(87) PCT Pub. No.: WO2021/020221
PCT Pub. Date: Feb. 4, 2021

(65) Prior Publication Data
US 2022/0274521 A1    Sep. 1, 2022

(30) Foreign Application Priority Data
Jul. 31, 2019 (JP) .................................. 2019-141114

(51) Int. Cl.
*B60Q 1/34* (2006.01)
*G06F 1/14* (2006.01)

(52) U.S. Cl.
CPC *B60Q 1/34* (2013.01); *G06F 1/14* (2013.01)

(58) Field of Classification Search
CPC .................................. B60Q 1/34; G06F 1/14
See application file for complete search history.

(56) References Cited

U.S. PATENT DOCUMENTS

| | | | |
|---|---|---|---|
| 9,756,590 B2 | 9/2017 | Koenigseder et al. | |
| 2005/0248442 A1* | 11/2005 | Wagner | H05B 41/30 340/471 |
| 2017/0253172 A1 | 9/2017 | Canonne et al. | |
| 2019/0058611 A1 | 2/2019 | Maeda et al. | |

FOREIGN PATENT DOCUMENTS

| | | |
|---|---|---|
| JP | 2001-138804 A | 5/2001 |
| JP | 2017-61278 A | 3/2017 |
| JP | 2017-162805 A | 9/2017 |
| JP | 2017-212725 A | 11/2017 |
| JP | 2019-81422 A | 5/2019 |

OTHER PUBLICATIONS

International Search Report and Written Opinion mailed on Sep. 29, 2020, received for PCT Application PCT/JP2020/028184, Filed on Jul. 21, 2020, 8 pages including English Translation.

* cited by examiner

*Primary Examiner* — Jacob M Amick
(74) *Attorney, Agent, or Firm* — XSENSUS LLP (57) ABSTRACT

A vehicle control system includes a plurality of zone ECUs and a central processing unit. Each zone ECU outputs a blinking timing signal for blinking a blinker installed in a vehicle on the basis of a blinking control signal received from the central processing unit. Furthermore, the zone ECUs are configured to be connected to each other via a local network, share blinking timing information of the blinker with another zone ECU via the local network, and adjust a blinking timing signal of the zone ECUs on the basis of the shared information.

2 Claims, 10 Drawing Sheets

VEHICLE CONTROL SYSTEM

CROSS-REFERENCE TO RELATED APPLICATIONS

The present application is based on PCT filing PCT/JP2020/028184, filed Jul. 21, 2020, which claims priority to Japanese Application No. 2019-141114, filed Jul. 31, 2019, the entire contents of each are incorporated herein by reference.

TECHNICAL FIELD

The technology disclosed herein relates to a vehicle control system.

BACKGROUND ART

Patent Literature 1 discloses a technique in which a plurality of domains divided on the basis of the function of an in-vehicle device are provided, a domain control unit is provided for each domain, and a plurality of the domain control units are controlled by an integrated control unit. In Patent Literature 1, for example, each device control unit is implemented by a single or a plurality of ECUs, and these ECUs are connected by a hierarchical network.

Patent Literature 2 discloses a technique of providing a gateway or a network hub (HUB) that relays data transmission and reception between nodes in different networks in an in-vehicle network system.

CITATION LIST

Patent Literature

Patent Literature 1: JP 2017-61278 A
Patent Literature 2: JP 2017-212725 A

SUMMARY

Technical Problem

Recently, technology development related to vehicle automation (including partial automation) that controls a vehicle on the basis of environment information inside and outside the vehicle, driver information (hereinafter, simply and collectively referred to as "vehicle interior and exterior environment information"), and the like, including an autonomous driving system, has been promoted. In general, in the vehicle automation technology, the vehicle interior and exterior environment information (including information about a driver's operation) is acquired by a camera, a sensor, or the like (hereinafter, simply referred to as "sensor"), arithmetic processing is performed on the basis of the acquired vehicle interior and exterior environment information, and various actuators mounted on the vehicle are controlled on the basis of the arithmetic result. In the future, the arithmetic processing function and the control function of each actuator will be integrated into a central processing unit that integrally manages the operation of the entire vehicle.

Meanwhile, it is not realistic to directly connect the sensors and the actuators to the central processing unit in which functions are integrated as described above, because the number of signal lines increases. Consequently, as in Patent Literature 2, the in-vehicle network in which the electronic control unit (ECU) that functions as a network hub device and/or a gateway device is provided, and communication is performed via the ECU is assumed to be constructed. Furthermore, it is assumed that the network is configured with a high-speed interface such as Ethernet (registered trademark), while a conventional CAN interface remains at an end portion or the like in the network.

Then, in a case where the arithmetic processing function and the control function of each actuator are incorporated in the central processing unit, when actuators to be operated in synchronization are distributed in the vehicle, signal paths from the central processing unit to the actuators are different, and thus there is a possibility that control vibrations of the actuators cannot be synchronized. As a result, for example, there is a possibility that lighting timings deviate from each other in turn light devices of the respective units, or buzzer sound timings deviate from each other.

The technology disclosed herein has been made in view of such a point, and an object thereof is to enable synchronous control of actuators distributed in a vehicle even in a case where the control function of the actuator is incorporated in a central processing unit.

Solution to Problem

In order to solve the above problem, the technology disclosed herein relates to a vehicle control system including a plurality of zone ECUs each of which is disposed in each predetermined zone of a vehicle, and a central processing unit that integrally controls the zone ECUs, wherein the zone ECUs include a plurality of first zone ECUs that output a blinking timing signal for blinking a blinker installed in the vehicle on a basis of a blinking control signal received from the central processing unit, the central processing unit and each of the first zone ECUs are connected by a time synchronization network, whereas each of the first zone ECUs and the blinker are connected by a time asynchronous network, and the first zone ECUs are configured to be connected to each other via a local network, share blinking timing information of the blinker with another first zone ECU via the local network, and adjust the blinking timing signal of the first zone ECUs on a basis of the information shared.

As a result, actuators distributed in the vehicle can be synchronously controlled even in a case where the control function of the actuator is incorporated in the central processing unit. In addition, while the output function of the blinking control signal is incorporated in the central processing unit, timing adjustment is handled on a zone ECU side. As a result, it is possible to implement function distribution between the central processing unit and the zone ECU while the main function is incorporated in the central processing unit.

According to the vehicle control system described above, each of the first zone ECUs can be configured in a manner that in a case where the blinking timing of another first zone ECU is earlier than the blinking timing of the first zone ECUs, a turn-off start time during a blinking period is made to match a turn-off time of another first zone ECU.

Furthermore, the technology disclosed herein relates to a vehicle control system including a plurality of zone ECUs each of which is disposed in each predetermined zone of a vehicle, and a central processing unit that integrally controls the zone ECUs, wherein the zone ECUs include a plurality of first zone ECUs that output a timing signal for operating an actuator installed in the vehicle on a basis of a control signal received from the central processing unit, the central processing unit and each of the first zone ECUs are connected by a time synchronization network, whereas each of the first zone ECUs and the actuator are connected by a time asynchronous network, and the first zone ECUs are configured to be connected to each other via a local network, share drive timing information of the actuator with another first zone ECU via the local network, and adjust the timing signal of the first zone ECUs on a basis of the information shared.

As a result, actuators distributed in the vehicle can be synchronously controlled even in a case where the control function of the actuator is incorporated in the central processing unit. In addition, while the output function of the blinking control signal is incorporated in the central processing unit, timing adjustment is handled on a zone ECU side. That is, it is possible to implement function distribution between the central processing unit and the zone ECU while the main function is incorporated in the central processing unit.

Advantageous Effects

According to the technology disclosed herein, actuators distributed in the vehicle can be synchronously controlled even in a case where the control function of the actuator is incorporated in the central processing unit.

DESCRIPTION OF EMBODIMENTS

Hereinafter, exemplary embodiments will be described in detail with reference to the drawings. Note that, in the present specification, devices that execute traveling control, such as sensors and actuators mounted on a vehicle, are referred to as "in-vehicle devices" or simply "devices".

First Embodiment

Figure 1:
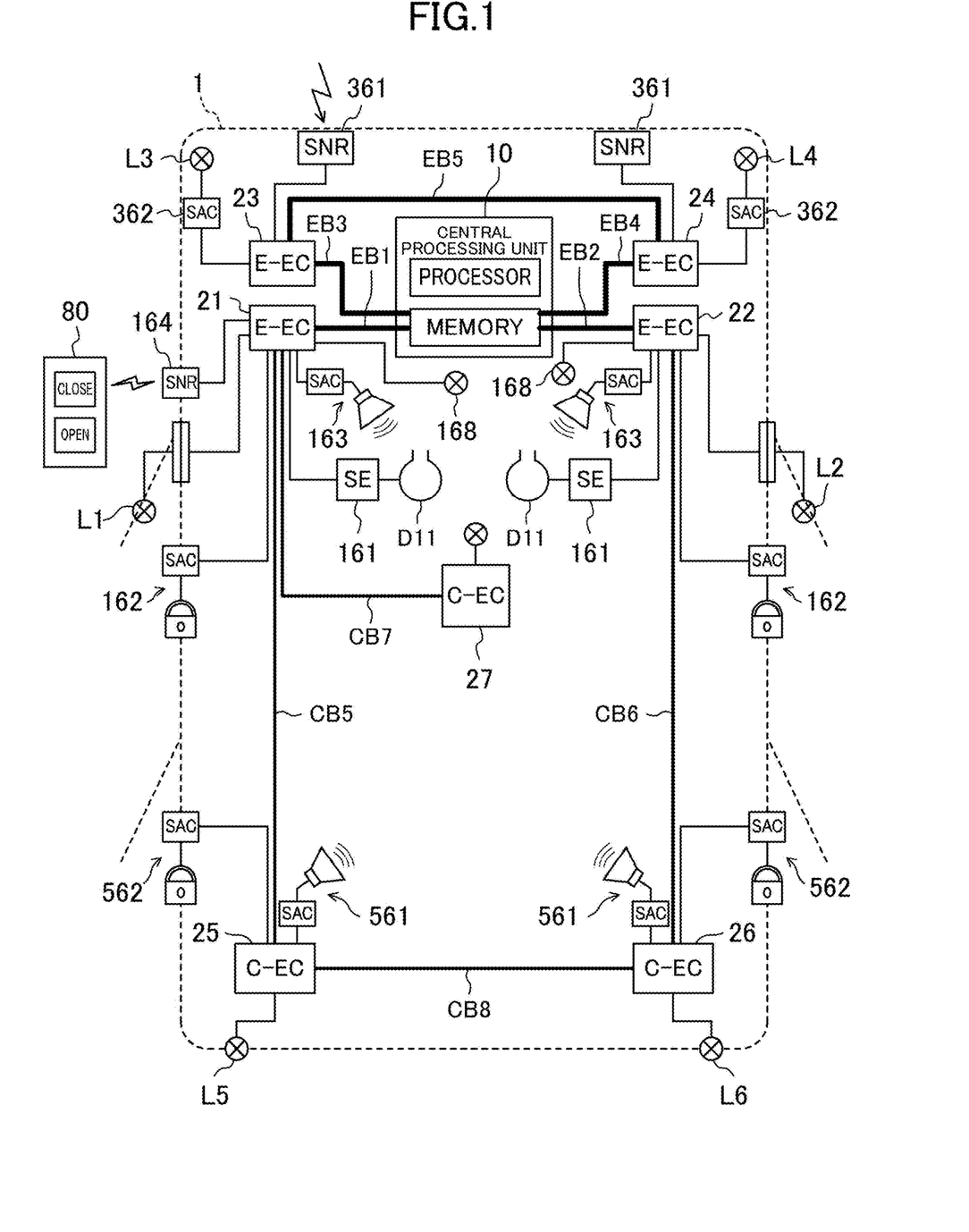
FIG. 1 is a diagram illustrating a configuration example of an in-vehicle network system.

FIG. 1 is a diagram illustrating a configuration example of an in-vehicle network system. The in-vehicle network system illustrated in FIG. 1 is mounted on a vehicle 1 and includes a plurality of zone ECUs 2 each of which is disposed in each predetermined zone of the vehicle and a central processing unit 10 that integrally controls the zone ECUs 2. In the in-vehicle network system of the present embodiment, an example is shown in which the vehicle 1 is divided into seven zones and each zone includes the zone ECU 2. The central processing unit 10 is an example of a central ECU. Although details will be described later, each zone ECU 2 functions as a network hub device having a function to relay information transmitted via a network.

In the following description, the zone ECU 2 disposed in the left dash zone near the left front seat of the vehicle 1 is referred to as "first zone ECU 21", and the zone ECU 2 disposed in the right dash zone near the right front seat of the vehicle 1 is referred to as "second zone ECU 22" in some cases. The zone ECU 2 disposed in the left front zone on the left front side of the vehicle 1 is referred to as "third zone ECU 23", and the zone ECU 2 disposed in the right front zone on the right front side of the vehicle 1 is referred to as "fourth zone ECU 24" in some cases. The zone ECU 2 disposed in the left rear zone on the left rear side of the vehicle 1 is referred to as "fifth zone ECU 25", and the zone ECU 2 disposed in the right rear zone on the right rear side of the vehicle 1 is referred to as "sixth zone ECU 26" in some cases. In some cases, the zone ECU 2 disposed in the console zone near the center console of the vehicle 1 is referred to as "seventh zone ECU 27". Note that when the zone ECU 21 to 27 are not distinguished, they are simply referred to as "zone ECU 2". When the number of zones is increased or decreased, the number of zone ECUs 2 is also increased or decreased accordingly.

The zone ECU 2 is configured to be able to connect in-vehicle devices such as a smart ECU, a smart actuator, a sensor, and/or an actuator, which will be described later. Note that the present embodiment shows an example in which the zone ECU 2 is provided in each zone, but the present invention is not limited thereto, and for example, the zone ECU for connecting an in-vehicle device corresponding to a specific function can be provided regardless of the zone. In addition, the zone can include a plurality of zone ECUs. Furthermore, the smart ECU can also function as the zone ECU, or the zone ECU can also function as the smart ECU.

In FIG. 1, the first zone ECU 21, the second zone ECU 22, the third zone ECU 23, and the fourth zone ECU 24 have a function as an Ethernet hub device (denoted as "E-EC" in FIG. 1) that transmits and receives Ethernet (registered trademark) signals to and from the central processing unit 10. Specifically, the central processing unit 10 and the first zone ECU 21 are connected by an Ethernet cable EB1, and the central processing unit 10 and the second zone ECU 22 are connected by an Ethernet cable EB2. The central processing unit 10 and the third zone ECU 23 are connected by an Ethernet cable EB3, and the central processing unit 10 and the fourth zone ECU 24 are connected by an Ethernet cable EB4. Furthermore, the third zone ECU 23 and the fourth zone ECU 24 are connected by an Ethernet cable EB5. The Ethernet protocol has a mechanism (Time Sensitive Networking (TSN)) for compensating for communication synchronization. The Ethernet protocol is an example of a time synchronization network. That is, in the example of FIG. 1, the central processing unit 10, the first zone ECU 21, the second zone ECU 22, the third zone ECU 23, and the fourth zone ECU 24 are connected by the time synchronization network. The first to fourth zone ECUs 21 to 24 are examples of a first zone ECU or a second zone ECU in the present disclosure. Note that the Ethernet signal is a signal conforming to the Ethernet protocol. Similarly, the CAN signal to be described later is a signal conforming to the CAN protocol, the CAN-FD signal is a signal conforming to the CAN-FD protocol, and the local interconnect network (LIN) signal is a signal conforming to the LIN protocol.

In FIG. 1, the fifth zone ECU 25, the sixth zone ECU 26, and the seventh zone ECU 27 function as a CAN hub device (denoted as "C-EC" in FIG. 1) that transmits and receives a CAN with Flexible Data-Rate (CAN-FD) signal or a CAN (Controller Area Network) signal to and from the central processing unit 10 and/or another zone ECU 2. Specifically, the first zone ECU 21 and the fifth zone ECU 25 are connected by a CAN-FD cable CB5, the second zone ECU 22 and the sixth zone ECU 26 are connected by a CAN-FD cable CB6, and the fifth zone ECU 25 and the sixth zone ECU 26 are connected by a CAN-FD cable CB8. In addition, the first zone ECU 21 and the seventh zone ECU 27 are connected by a CAN-FD cable CB7. Note that the CAN protocol, the CAN-FD protocol, and the LIN protocol are examples of time-asynchronous networks.

In the present embodiment, the network formed by signal transmission paths between the central processing unit 10 and the zone ECUs 2 and signal transmission paths between the zone ECUs 2 is referred to as "trunk network". In FIG. 1, the trunk network includes the Ethernet cables EB1 to EB5 and the CAN-FD cables CB5 to CB8. Referring to FIG. 1, in the trunk network, the transmission path of the Ethernet signal (a signal conforming to the Ethernet standard) is indicated by a thick solid line, and the transmission path of the CAN-FD signal or the CAN signal is indicated by a middle thick solid line. Furthermore, the signal transmission path from each of the zone ECUs 21 to 27 to the in-vehicle device side is referred to as "device-side network". In FIG. 1, the signal path from each of the zone ECUs 21 to 27 to each in-vehicle device, that is, the device-side network is indicated by a thin solid line. The signal paths indicated by thin solid lines include analog/digital signal paths, CAN signal paths, LIN signal paths, and CAN-FD signal paths.

In order to enable autonomous driving and assisted driving of the vehicle 1, the central processing unit 10 calculates a route on which the vehicle 1 should travel in response to outputs from sensors mounted on the vehicle 1, and determines the motion of the vehicle 1 for following the route. The central processing unit 10 is, for example, a processor including one or a plurality of chips, and has an artificial intelligence (AI) function in some cases. In the configuration example of FIG. 1, the central processing unit 10 includes a processor and a memory. The memory stores a module that is software executable by the processor. Each function of the central processing unit 10 is implemented, for example, by the processor executing a module corresponding to each function. Note that the processor and the memory can be provided in plural.

The sensors that output information to the central processing unit 10 include, for example, a camera that captures an environment outside the vehicle, a radar that detects a target or the like outside the vehicle, a global positioning system (GPS) sensor that detects a position of the vehicle 1, a vehicle state sensor that detects a behavior of the vehicle such as a vehicle speed, an acceleration, and a yaw rate, and an occupant state sensor that acquires a state of an occupant of the vehicle such as an in-vehicle camera. Furthermore, communication information from other vehicles located around an own vehicle and/or traffic information from a navigation system can be input to the central processing unit 10.

Figure 2:
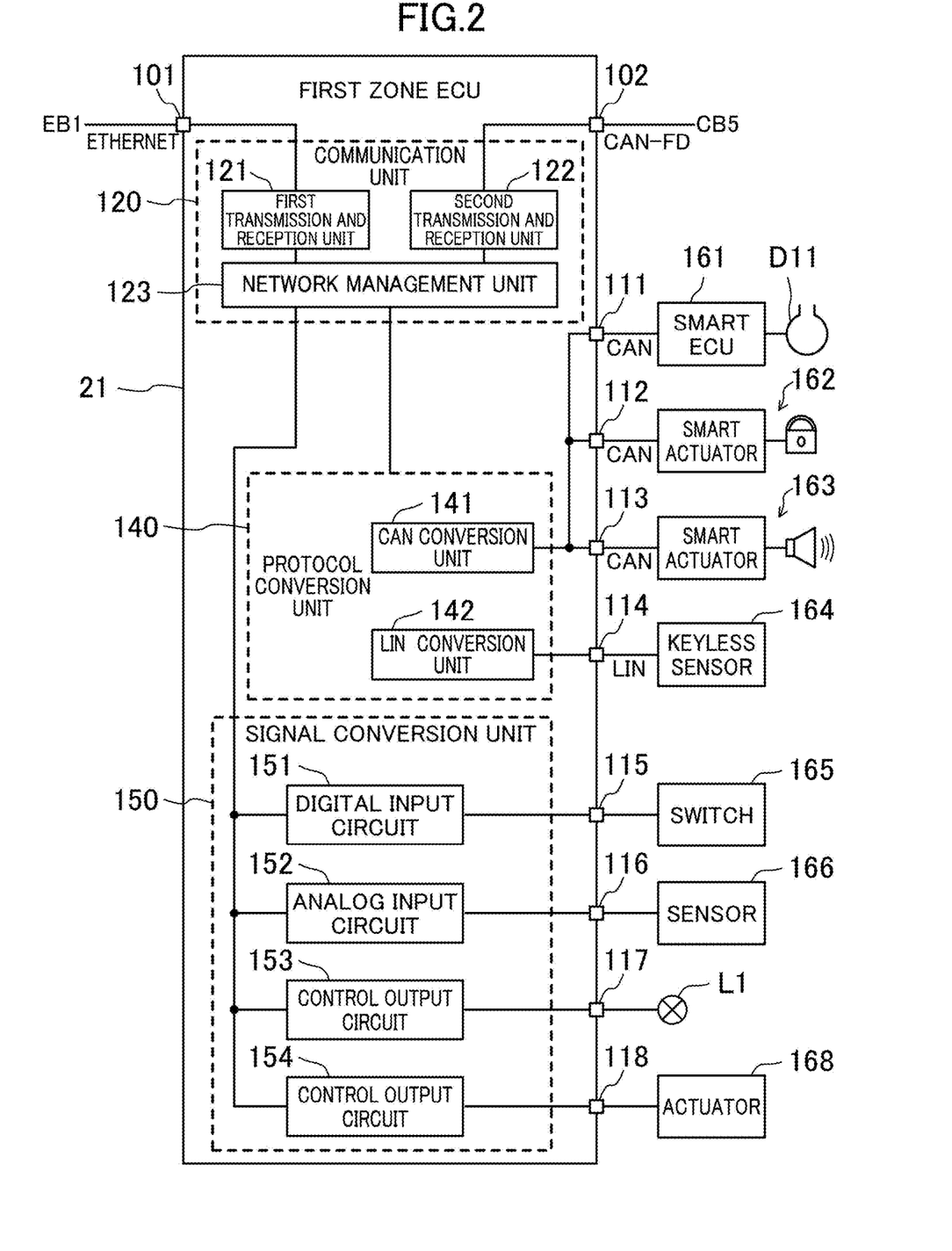
FIG. 2 is a diagram illustrating a functional configuration example of a first zone ECU.

FIG. 2 is a diagram illustrating a functional configuration example of the first zone ECU 21.

The first zone ECU 21 includes a communication unit 120, a protocol conversion unit 140, and a signal conversion unit 150. The protocol conversion unit 140 includes a CAN conversion unit 141 and a LIN conversion unit 142. The signal conversion unit 150 includes a digital input circuit 151, an analog input circuit 152, and control output circuits 153 and 154.

The first zone ECU 21 includes, as communication ports (hereinafter, referred to as "trunk ports") connected to the trunk network, a trunk port 101 to which the Ethernet cable EB1 is connected and a trunk port 102 to which the CAN-FD cable CB5 is connected. In other words, the trunk port 101 and the trunk port 102 are ports to which a trunk network signal that is a signal transmitted on the trunk network is input and output.

The first zone ECU 21 includes communication ports 111 to 118 as communication ports connected to the device-side network. The first zone ECU 21 inputs and outputs CAN signals via the communication ports 111 to 113, inputs and outputs LIN signals via the communication port 114, inputs digital control signals via the communication port 115, inputs analog control signals via the communication port 116, and outputs analog control signals via the communication ports 117 and 118. For example, the communication port 111 is connected to a smart ECU 161, and the smart ECU 161 is connected to an airbag device D11. For example, the communication port 112 is connected to a smart actuator 162 for locking and unlocking a side door. For example, the communication port 113 is connected to a smart actuator 163 for emitting a buzzer sound or the like. For example, the communication port 114 is connected to a sensor 164 (hereinafter, referred to as "keyless sensor 164") for operating a keyless device. For example, the communication port 115 is connected to a switch 165 (for example, a clutch cut switch, a brake switch, or the like). For example, the communication port 116 is connected to a sensor 166 (for example, an accelerator pedal sensor, a clutch stroke sensor, or the like). For example, the communication port. 117 is connected to a left-side turn light L1 provided on a door mirror on the left side of the vehicle. For example, the communication port 118 is connected to an actuator 168 (for example, an indicator lamp or the like attached to a horn, a keyless buzzer, a meter device, or the like). Note that, in the drawings, the symbol mark of a lock mechanism is illustrated in addition to the smart actuator 162 for easy understanding of the description. Furthermore, in addition to the smart actuator 162, the symbol mark of a sound source mechanism is illustrated.

Although not specifically illustrated, the in-vehicle device can be attached or detached by inserting a connector at the distal end of a cable extending from the in-vehicle device into each of the communication ports 111 to 118. In addition, each of the communication ports 111 to 118 can be connected to a smart connector (not illustrated), and the in-vehicle device can be attached to the smart connector. The smart connector SC includes, for example, an analog/digital conversion circuit, a driver circuit, and the like, and has a function of transmitting a drive signal to an actuator serving as the in-vehicle device, and/or a function of transmitting an input signal from a sensor serving as the in-vehicle device to the zone ECU 2.

The communication unit 120 includes a first transmission and reception unit 121 connected to the trunk port 101, a second transmission and reception unit 122 connected to the trunk port 102, and a network management unit 123.

The first transmission and reception unit 121 has a function of transmitting and receiving a trunk network signal (an Ethernet signal) to and from the central processing unit 10 via the trunk port 101 and the Ethernet cable EB1. Although not specifically illustrated, the first transmission and reception unit 121 includes, for example, a coding circuit that generates an Ethernet signal, a driver circuit that outputs the Ethernet signal generated by the coding circuit to the central processing unit 10, a receiver circuit that receives the Ethernet signal output from the central processing unit 10, and a decoding circuit that decodes the Ethernet signal received by the receiver circuit.

The second transmission and reception unit 122 has a function of transmitting and receiving a trunk network signal (a CAN-FD signal) to and from the fifth zone ECU 25 via the trunk port. 102 and the CAN-FD cable CB5. Although not specifically illustrated, the second transmission and reception unit 122 includes, for example, a coding circuit that generates a CAN-FD signal, a driver circuit that outputs the CAN-FD signal generated by the coding circuit to the fifth zone ECU 25, a receiver circuit that receives the CAN-FD signal output from the fifth zone ECU 25, and a decoding circuit that decodes the CAN-FD signal received by the receiver circuit.

The network management unit 123 has (a) a relay function of relaying a trunk network signal on a trunk network, that is, between the trunk ports 101 and 102, (b) a distribution function of extracting a signal for a device connected to the own ECU from trunk network signals and distributing the signal, and (c) an integration function of integrating data to be transmitted from the device connected to the own ECU to the central processing unit 10 and/or another zone ECU 2. Note that, in the following description (including description of other zone ECUs 2), the functions mentioned above may be simply referred to as "(a) relay function", "(b) distribution function", and "(c) integration function".

The protocol conversion unit 140 performs protocol conversion so that data can be exchanged between communication schemes. Specifically, the protocol conversion unit 140 is connected to the network management unit 123, and performs protocol conversion according to each of "(a) relay function", "(b) distribution function", and "(c) integration function" of the network management unit 123 described above. Note that, in the present embodiment, the protocol conversion includes a conversion process such as data length conversion between CAN and CAN-ED.

In "(a) relay function", the network management unit 123 extracts data (hereinafter, referred to as "relay data") to be transmitted to the fifth zone ECU 25 from the Ethernet signal input from the central processing unit 10, and outputs the extracted data to the protocol conversion unit 140. The protocol conversion unit 140 converts relay data to CAN protocol data and outputs the CAN protocol data to the network management unit 123. The network management unit 123 generates a CAN signal on the basis of the CAN protocol data. The second transmission and reception unit 122 then outputs the CAN signal to the fifth zone ECU 25 via the trunk port 102. Similarly, the network management unit 123 extracts data (hereinafter, referred to as "relay data") to be transmitted to the central processing unit 10 from the CAN signal input from the fifth zone ECU 25, and outputs the extracted data to the protocol conversion unit 140. The protocol conversion unit 140 converts the relay data to data in a format conforming to the Ethernet protocol and outputs the data to the network management unit 123. The network management unit 123 generates an Ethernet signal on the basis of the converted data. The first transmission and reception unit 121 then outputs the Ethernet signal to the central processing unit 10 via the trunk port 101.

In "(b) distribution function", the network management unit 123 extracts data (hereinafter, referred to as "own ECU data") for a device connected to the own ECU from the Ethernet signal input from the central processing unit 10. The network management unit 123 determines whether the data for the own ECU is data for a device connected to the protocol conversion unit 140 or data for a device connected to the signal conversion unit 150, and distributes the data to each of the units. In the protocol conversion unit 140, when data for devices connected to the communication ports 111 to 113 is received from the network management unit 123, the CAN conversion unit 141 converts the received data to a signal conforming to the CAN protocol and outputs the signal to the communication ports 111 to 113. As a result, a signal (for example, a control signal) from the central processing unit is transmitted to each of the smart ECU 161 and the smart actuators 162 and 163. In the signal conversion unit 150, when data for controlling the left-side turn light L1 connected to the communication port 117 is received from the network management unit 123, the control output circuit 153 generates, for example, an analog control signal of the left-side turn light L1 according to a control value received from the central processing unit 10, and outputs the analog control signal to the communication port 117. Similarly, in the signal conversion unit 150, when data for controlling the actuator 168 connected to the communication port 118 is received from the network management unit 123, the control output circuit 154 generates, for example, an analog control signal of the actuator 168 according to a control value received from the central processing unit 10, and outputs the analog control signal to the communication port 118. Note that, the process similar to that in the case of the central processing unit 10 described above is also performed in a case where data for a device connected to the own ECU is included in the CAN signal input from the fifth zone ECU 25.

In "(c) integration function", for example, the protocol conversion unit 140 receives an unlock signal (a LIN signal) from the keyless sensor 164, converts data conforming to the LIN protocol to data conforming to the Ethernet protocol, and transmits the converted data to the network management unit 123. Furthermore, for example, in the signal conversion unit 150, the digital input circuit 151 receives an input signal from the switch 165, the analog input circuit 152 receives an input signal from the sensor 166, and the circuits 151 and 152 transmit the received data to the network management unit 123. The network management unit 123 integrates the received data from the protocol conversion unit 140 and the received data from the signal conversion unit 150. The first transmission and reception unit 121 outputs the data integrated by the network management unit 123, as an Ethernet signal, to the central processing unit 10 via the trunk port 101. Note that, the process similar to that in the case of outputting the data to the central processing unit 10 is also performed in the case of transmitting the data integrated by the integration function to the fifth zone ECU 25.

Note that, in the present embodiment, the second zone ECU 22 has the same configuration as the first zone ECU 21, and the same reference signs are given to in-vehicle devices connected to the respective zone ECUs 21 and 22. Here, the detailed description of the second zone ECU 22 will be omitted. However, in practice, the first zone ECU 21 and the second zone ECU 22 can have completely different configurations, and/or different in-vehicle devices can be connected to the respective zone ECUs 21 and 22. Note that, for convenience of the following description, the right-side turn light that is provided on the side mirror on the right side of the vehicle and is connected to the second zone ECU 22 is distinguished from the left-side turn light L1 connected to the first zone ECU 21, and is denoted by a reference sign L2.

Figure 3:
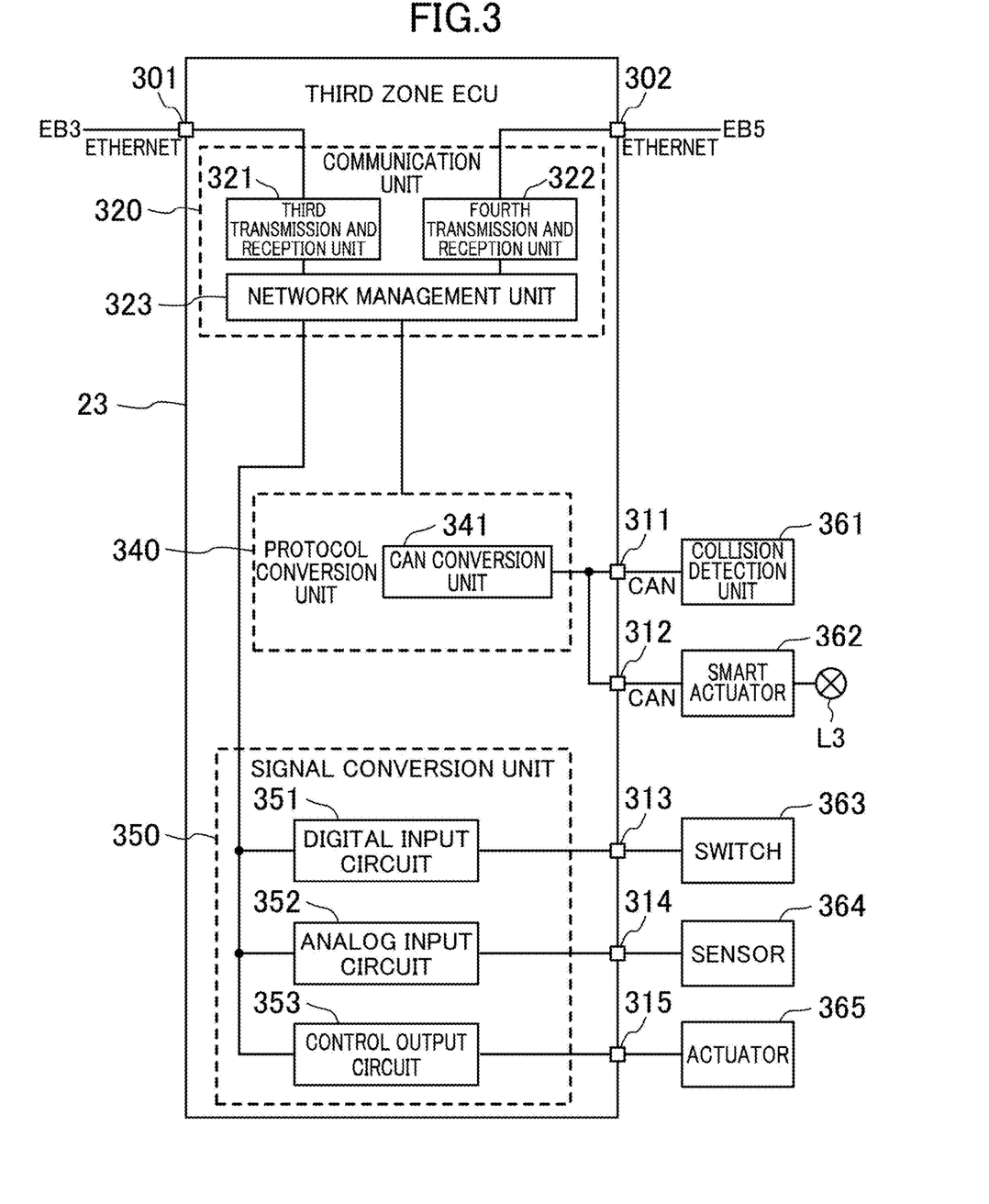
FIG. 3 is a diagram illustrating a functional configuration example of a third zone ECU.

FIG. 3 illustrates a functional configuration example of the third zone ECU 23. Here, the description of the same configuration as that of the first zone ECU 21 may be omitted.

The third zone ECU 23 includes a communication unit 320, a protocol conversion unit 340, and a signal conversion unit 350. The protocol conversion unit 340 includes a CAN conversion unit 341. The signal conversion unit 350 includes a digital input circuit 351, an analog input circuit 352, and a control output circuit 353.

The third zone ECU 23 includes a trunk port 301 to which the Ethernet cable EB3 is connected and a trunk port 302 to which the Ethernet cable EB5 is connected. In other words, the trunk port 301 and the trunk port 302 are ports to which a trunk network signal is input and output.

The third zone ECU 23 includes communication ports 311 to 315 as device ports. The third zone ECU 23 inputs and outputs CAN signals via the communication ports 311 and 312, inputs digital control signals via the communication port 313, inputs analog control signals via the communication port 314, and outputs analog control signals via the communication port 315. For example, the communication port 311 is connected to a collision detection unit 361 that detects a collision of the vehicle 1. For example, the communication port 312 is connected to a smart actuator 362 for operating a left-front turn light L3 on the left side of the vehicle. For example, the communication port 313 is connected to a switch 363 (for example, a washer level switch, a hood switch, or the like). For example, the communication port 314 is connected to a sensor 364 (for example, an outside air temperature sensor, an air flow sensor, or the like). For example, the communication port 315 is connected to art actuator 365 (for example, a horn, a keyless buzzer, or the like).

The communication unit 320 includes a third transmission and reception unit 321 connected to the trunk port 301, a fourth transmission and reception unit 322 connected to the trunk port 302, and a network management unit 323. Note that, in the communication unit 320, the configuration and function related to the invention of the present application are similar to those of the communication unit 120 of the first zone ECU 21 described above, and thus the detailed description thereof will be omitted here. Specifically, the difference is that the second transmission and reception unit 122 conforms to the CAN-FD protocol in the first zone ECU 21, whereas the fourth transmission and reception unit 322 conforms to the Ethernet protocol in the third zone ECU 23. However, the configuration of the transmission and reception circuit and the delay information conforming to each communication scheme can be replaced on the basis of the conventional technique.

The protocol conversion unit 340 performs protocol conversion so that data can be exchanged between communication schemes. Here, the difference between the protocol conversion unit 340 and the protocol conversion unit 140 of the first zone ECU 21 will be mainly described, and the description of the same contents may be omitted.

The third zone ECU 23 relays between an Ethernet signal and an Ethernet signal in "(a) relay function". Consequently, unlike the protocol conversion unit 140 described above, the protocol conversion unit 340 does not require protocol conversion in the relay process. "(b) Distribution function" and "(c) integration function" in the third zone ECU 23 have the same contents as those in the first zone ECU 21 described above, and thus the detailed description thereof will be omitted here.

Note that, in the present embodiment, the fourth zone ECU 24 has the same configuration as the third zone ECU 23, and the same reference signs are given to in-vehicle devices connected to the respective zone ECUs 23 and 24. Here, the detailed description of the fourth zone ECU 24 will be omitted. However, in practice, the third zone ECU 23 and the fourth zone ECU 24 can have completely different configurations, and/or different in-vehicle devices can be connected to the respective zone ECUs 23 and 24. Note that, for convenience of the following description, the right-front turn lamp that is provided on the right side of the vehicle and is connected to the fourth zone ECU 24 is distinguished from the left-front turn light L3 connected to the third zone ECU 23, and is denoted by a reference sign L4.

Figure 4:
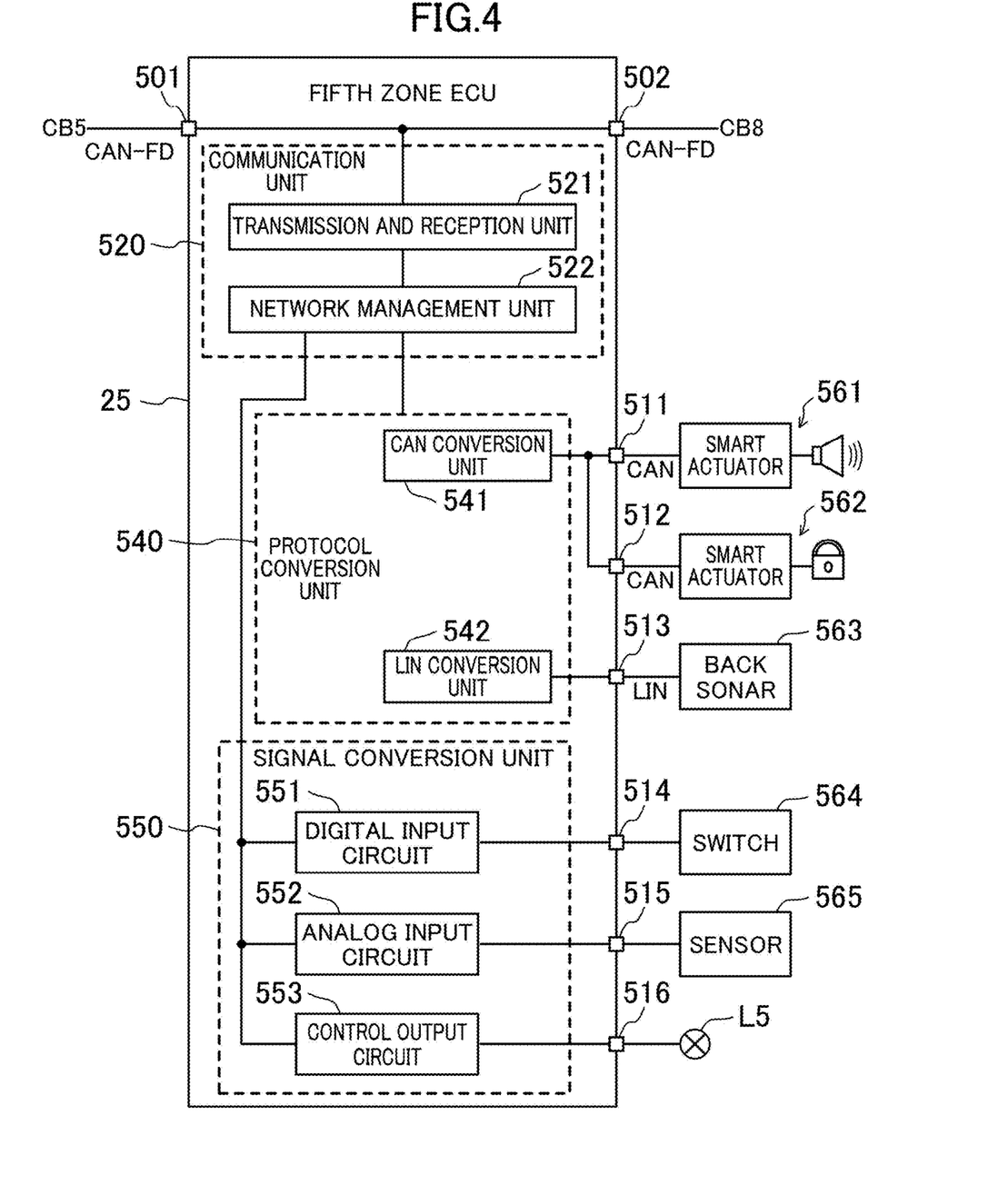
FIG. 4 is a diagram illustrating a functional configuration example of a fifth zone ECU.

FIG. 4 illustrates a functional configuration example of the fifth zone ECU 25. Here, the description of the same configuration as that of the first zone ECU 21 and/or the third zone ECU 23 may be omitted.

The fifth zone ECU 25 includes a communication unit 520, a protocol conversion unit 540, and a signal conversion unit 550. The protocol conversion unit 540 includes a CAN conversion unit 541 and a LIN conversion unit 542. The signal conversion unit 550 includes a digital input circuit 551, an analog input circuit 552, and a control output circuit 553.

The fifth zone ECU 25 includes a trunk port 501 to which the CAN-FD cable CB5 is connected and a trunk port 502 to which the CAN-FD cable CB8 is connected. In other words, in the fifth zone ECU 25, a CAN-FD signal is input and output to and from the trunk port 501 and the trunk port 502, and the trunk port 501 and the trunk port 502 are directly connected.

The fifth zone ECU 25 includes communication ports 511 to 516 as device ports. The fifth zone ECU 25 inputs and outputs CAN signals via the communication ports 511 and 512, inputs and outputs LIN signals via the communication port 513, inputs digital control signals via the communication port 514, inputs analog control signals via the communication port 515, and outputs analog control signals via the communication port 516. For example, the communication port 511 is connected to a smart actuator 561 for emitting a buzzer sound or the like. For example, the communication port 512 is connected to a smart actuator 562 for locking a side door. For example, the communication port 513 is connected to a back sonar device 563. For example, the communication port 514 is connected to a switch 564. For example, the communication port 515 is connected to a sensor 565 (for example, a fuel sensor, a kick sensor, or the like). For example, the communication port 516 is connected to a left-rear turn light L5 on the left rear of the vehicle. Note that, in the drawings, the symbol mark of the sound source mechanism is illustrated in addition to the smart actuator 561 for easy understanding of the description. Furthermore, in addition to the smart actuator 562, the symbol mark of the lock mechanism is illustrated.

The communication unit 520 includes a transmission and reception unit 521 connected to a common communication line connecting the trunk port 501 and the trunk port 502 and a network management unit 522. Although not specifically illustrated, the transmission and reception unit 521 includes, for example, a coding circuit that generates a CAN-FD signal, a driver circuit and a receiver circuit connected to the common communication line, and a decoding circuit that decodes the CAN-FD signal received by the receiver circuit.

The protocol conversion unit 540 performs protocol conversion so that data can be exchanged between communication schemes. Here, the difference between the protocol conversion unit 540 and the protocol conversion unit 140 of the first zone ECU 21 will be mainly described, and the description of the same contents may be omitted.

In the fifth zone ECU 25, since the trunk port 501 and the trunk port 502 are directly connected, there is no concept of "(a) relay function". "(b) Distribution function" and (c) integration function" in the fifth zone ECU 25 have the same contents as those in the first zone ECU 21 described above, and thus the detailed description thereof will be omitted here.

Note that, in the present embodiment, the sixth zone ECU 26 has the same configuration as the fifth zone ECU 25, and the same reference signs are given to in-vehicle devices connected to the respective zone ECUs 25 and 26. Here, the detailed description of the sixth zone ECU 26 will be omitted. However, in practice, the fifth zone ECU 25 and the sixth zone ECU 26 can have completely different configurations, and/or different in-vehicle devices can be connected to the respective zone ECUs 25 and 26. Note that, for convenience of the following description, the right-rear turn lamp that is provided on the right rear side of the vehicle and is connected to the sixth zone ECU 26 is distinguished from the left-rear turn light L5 connected to the fifth zone ECU 25, and is denoted by a reference sign L6.

<Blinking Control of Turn Light>
—Outline—

As described in "Technical Problem", in the future, the arithmetic processing function and the control function of each actuator will be integrated into a central processing unit that integrally manages the operation of the entire vehicle. This means that the arithmetic function and the control function currently mounted on an ECU provided for each zone of the vehicle and an ECU (hereinafter, collectively referred to as "conventional ECU") provided for each function as in Patent Literature 1 are incorporated in the central processing unit.

As described above, it is not realistic to directly connect each sensor and each actuator to the central processing unit in which functions are integrated, because the number of signal lines increases, and thus the in-vehicle network is assumed to be constructed. Then, a relay device such as a network hub device and/or a gateway device is interposed between the central processing unit and an in-vehicle device or an ECU that controls the in-vehicle device.

In addition, in a case where functions are integrated in the central processing unit, it is necessary to implement high-speed and large-capacity data transmission, and for this purpose, high-speed interface technology is needed to be applied. On the other hand, applying the high-speed interface technology to the entire network including between the zone ECU and the in-vehicle device has disadvantages in terms of design cost and design efficiency. Consequently, it is assumed that a network using the high-speed interface technology and a network using the CAN protocol and/or the LIN protocol that is conventionally used are mixed. As a result, a time synchronization network represented by Ethernet and a time asynchronous network represented by CAN and CAN-FD may be mixed. In addition, the relay devices such as network hub devices or gateway devices interposed between the central processing unit and the in-vehicle device may have different configurations. As a result, as described above, there is a possibility that lighting timings deviate from each other in a plurality of turn lights, and/or buzzer sound timings deviate from each other in a plurality of sound generation devices.

From the viewpoint of the turn light, the invention of the present application is characterized in that, for example, the central processing unit 10 transmits a blinking control signal to each zone ECU 2, and then each zone ECU 2 transmits blinking timing information, and the timing is readjusted on the basis of the blinking timing information.

Hereinafter, a specific description will be given with reference to the drawings.

Figure 5:
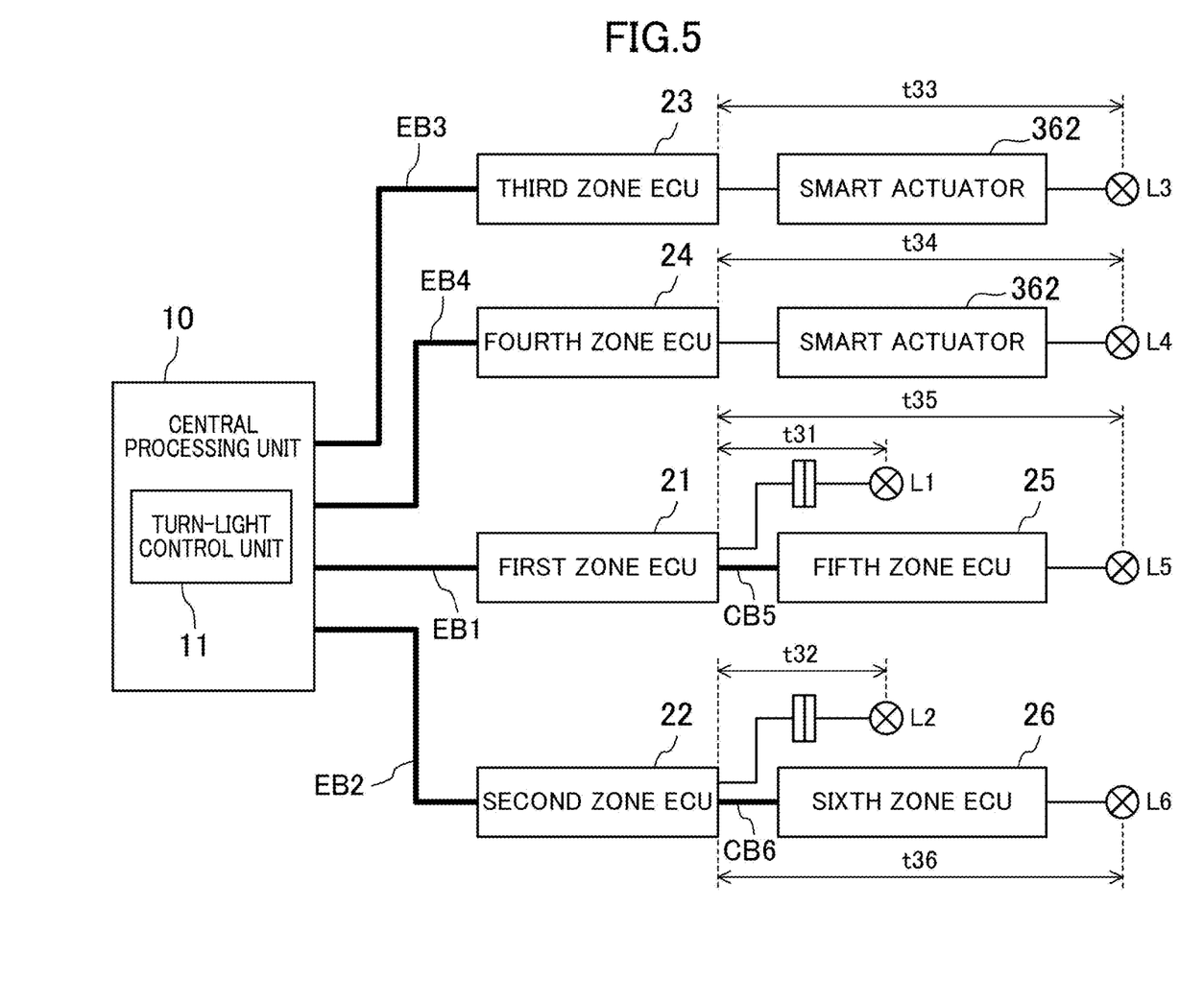
FIG. 5 is a diagram illustrating an example of a connection configuration of turn lights according to a first embodiment.

FIG. 5 is obtained by extracting a network configuration from the central processing unit 10 to the turn lights L1 to L6 in FIG. 1. As illustrated in FIG. 5, the turn lights L1 to L6 are connected in a daisy chain layout from the central processing unit 10. In addition, as illustrated in FIG. 5, the central processing unit 10 includes a turn-light control unit 11 that outputs a blinking control signal indicating the start of blinking, end of blinking, and/or blinking timing of the turn light. Note that, in the following description, the turn lights L1 to L6 may be simply referred to as "turn light L" in a case where the turn lights L1 to L6 are described without distinction, a case where the turn lights L1 to L6 are collectively described, or the like.

As described above, the central processing unit and the first to fourth zone ECUs 21 to 24 are connected by a time synchronization Ethernet network. That is, when a blinking control signal is transmitted from the turn-light control unit 11 to the first to fourth zone ECUs 21 to 24, substantially synchronized blinking control signals are output from the first to fourth zone ECUs 21 to 24. On the other hand, the first zone ECU 21 and the left-side turn light L1, the second zone ECU 22 and the right-side turn light L2, the third zone ECU 23 and the left-front turn light L3, the fourth zone ECU 24 and the right-front turn light L4, the first zone ECU 21 and the fifth zone ECU 25, the fifth zone ECU 25 and the left-rear turn light L5, the second zone ECU 22 and the sixth zone ECU 26, and the sixth zone ECU 26 and the right-rear turn light L6 are connected by a time asynchronous CAN-FD or CAN network. Furthermore, as illustrated in FIG. 5, the communication paths from the first to fourth zone ECUs 21 to 24 to the turn lights L1 to L6 have different communication path lengths and interposing devices (including ECUs). Consequently, even when substantially synchronized blinking control signals are output from the first to fourth zone ECUs 21 to 24, the blinking timings of the turn lights L1 to L6 may be different from each other. The turn lights L1 to L4 are examples of blinkers.

Figure 6:
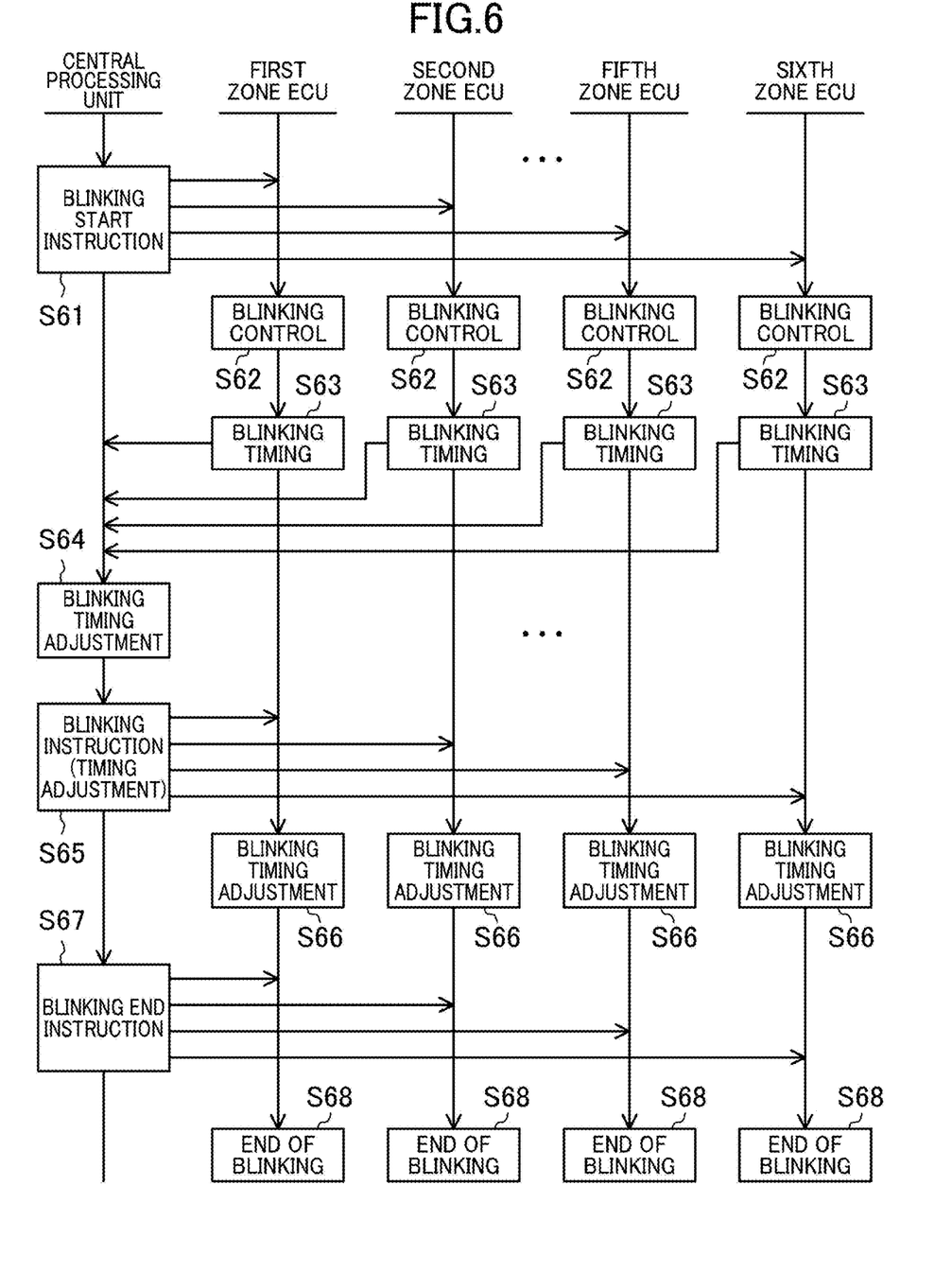
FIG. 6 is a flowchart illustrating an example of blinking control of the turn lights according to the first embodiment.

In the present embodiment, the blinking control of the turn lights L1 to L6 is executed in a flow as illustrated in FIG. 6.

Specifically, in step S61 of FIG. 6, the central processing unit 10 transmits a blinking start instruction to the zone ECUs 21 to 26 as a blinking control signal. In step S62, when receiving the blinking start instruction from the central processing unit 10, the zone ECUs 2 execute blinking control of the turn lights L1 to L6 connected to themselves. Specifically, the first zone ECU 21 outputs a blinking control signal to the left-side turn light L1, the second zone ECU 22 outputs a blinking control signal to the right-side turn light L2, the third zone ECU 23 outputs a blinking control signal for the left-front turn light L3 to the smart actuator 362, the fourth zone ECU 24 outputs a blinking control signal for the right-front turn light L4 to the smart actuator 362, the fifth zone ECU 25 outputs a blinking control signal to the left-rear turn light L5, and the sixth zone ECU 26 outputs a blinking control signal to the right-rear turn light L6.

In the next step S63, each zone ECU 2 transmits blinking timing information of the turn light L controlled by each zone ECU 2 to the central processing unit 10. For example, the first zone ECU 21 transmits, to the central processing unit 10, a time t31 from when the first zone ECU 21 outputs a blinking control signal to when the left-side turn light L1 blinks as the blinking timing information of the left-side turn light L1. Similarly, the second zone ECU 22 to the sixth zone ECU 26 transmit, to the central processing unit. 10, times t32 to t36 from when the second zone ECU 22 to the sixth zone ECU 26 output a blinking control signal to when the turn lights blink, as the blinking timing information of the turn lights connected to the second zone ECU 22 to the sixth zone ECU 26.

Here, in the third and fourth zone ECUs 23 and 24, the turn light is controlled via the smart actuator 362. Consequently, the third and fourth zone ECUs 23 and 24 can include the signal processing time of the smart actuator 362 as the blinking timing information. Specifically, for example, the third zone ECU 23 can receive the blinking timing information of the left-front turn light L3 from the smart actuator 362, and calculate the time t33 on the basis of the information. In addition, since the fifth zone ECU 25 is connected to the first zone ECU 21 by the CAN-FD cable CB5, a delay is generated accordingly. The fifth zone ECU 25 can thus include the communication delay time with the first zone ECU 21 as the blinking timing information.

In the next step S64, the central processing unit 10 calculates a timing adjustment signal for adjusting the timing so that the blinking timings of the turn lights L1 to L6 match on the basis of the blinking timing of each turn light received from each zone ECU 2. Thereafter, in step S65, the calculated timing adjustment signal is transmitted to each zone ECU 2. As a result of calculating the timing adjustment signal, the timing adjustment signal does not need to be output to the turn light L in which the deviation of the blinking timing is within a predetermined allowable range. The timing adjustment signal is an example of adjustment information.

In step S66, each zone ECU 2 outputs a blinking control signal whose blinking timing has been adjusted to the turn light on the basis of the timing adjustment signal received from the central processing unit 10.

Thereafter, when a blinking end instruction is transmitted as a blinking control signal from the central processing unit 10 to each zone ECU 2 in step S67, each zone ECU 2 ends blinking of the turn light (step S68).

As described above, according to the present embodiment, the central processing unit 10 transmits a blinking control signal to each zone ECU 2, and then receives the blinking timing information from each zone ECU 2. In addition, the central processing unit 10 transmits a timing adjustment signal for adjusting the blinking timing on the basis of the received blinking timing information to each zone ECU 2. As a result, even in a case where the time synchronization network and the time asynchronous network are mixed in the network between the central processing unit 10 and the turn light L, the blinking timings of the turn lights can match.

Second Embodiment

The present embodiment is characterized in that communication jitter and/or a control timing are managed on the side of the zone ECU 2 so as not to deviate by a predetermined time (for example, 10 msec) or longer as the synchronization control of the turn lights L1 to L6 after the central processing unit 10 transmits a base blinking control signal.

Figure 7:
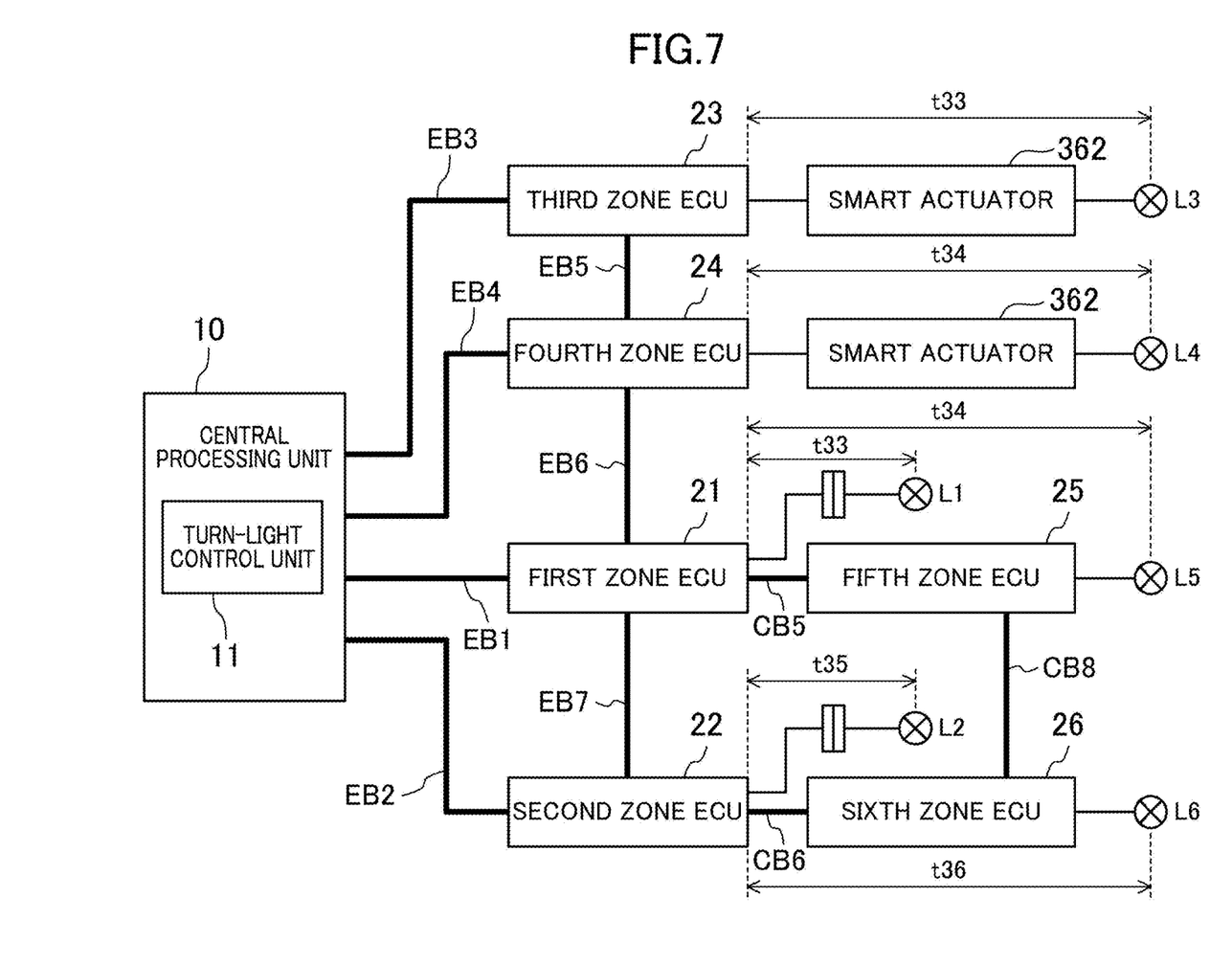
FIG. 7 is a diagram illustrating an example of a connection configuration of turn lights according to a second embodiment.

FIG. 7 illustrates a configuration example of a network from the central processing unit 10 to the turn lights L1 to L6 in the present embodiment. Here, differences from the first embodiment will be mainly described, and the description of the same configurations and operations may be omitted.

The configuration of FIG. 7 is different from that of the first embodiment in that the zone ECUs 2 are connected by a network, and the zone ECUs 2 can communicate with each other without passing through the central processing unit 10. Specifically, the first zone ECU 21 and the second zone ECU 22 are connected by an Ethernet cable EB7, and the first zone ECU 21 and the fourth zone ECU 24 are connected by an Ethernet cable EB6. Furthermore, as described above, the third zone ECU 23 and the fourth zone ECU 24 are connected by the Ethernet cable EB5, and the fifth zone ECU 25 and the sixth zone ECU 26 are connected by the CAN-FD cable CB8. Note that the configuration of each zone ECU 2 and the connection configuration between each zone ECU 2 and the turn light L are the same as those in the first embodiment described above, and the detailed description thereof will be omitted here. In the present disclosure, as illustrated in FIG. 7, the network in which the zone ECUs 2 can communicate with each other without processing of the central processing unit 10 interposed therebetween is referred to as "local network". In other words, the Ethernet cables EB5 to EB7 are examples of cables constituting the local network, and the first zone ECU 21 to the fourth zone ECU 24 are connected by the local network. That is, the first zone ECU 21 to the fourth zone ECU 24 are examples of a first zone ECU. The information transmitted and received between the first zone ECU 21 to the fourth zone ECU 24 via the Ethernet cables EB5 to EB7 without the processing of the central processing unit 10 interposed therebetween is an example of information transmitted and received via the local network.

—Blinking Control of Turn Light (1)—

Figure 8:
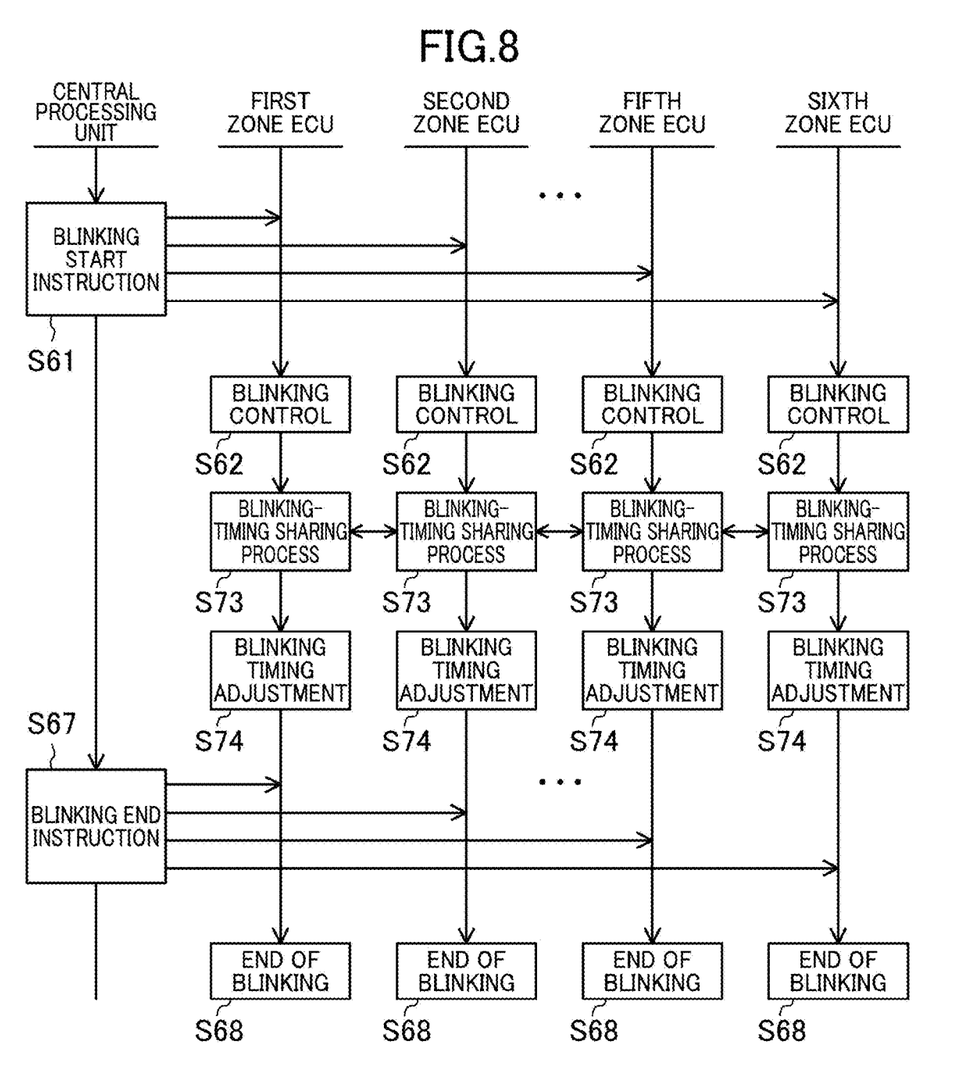
FIG. 8 is a flowchart illustrating an example of blinking control of the turn lights according to the second embodiment.

FIG. 8 illustrates an example of a blinking control operation of a turn light in a vehicle control system described in the second embodiment. Note that, in FIG. 8, the same operations as those in FIG. 6 are denoted by the same reference signs, and the description thereof may be omitted.

In step S61 of FIG. 8, as in the case of FIG. 6, the central processing unit 10 transmits a blinking start instruction to each zone ECU 2 as a blinking control signal. In step S62, when receiving the blinking start instruction from the central processing unit 10, the zone ECUs 2 execute blinking control of the turn lights L1 to L6 connected to themselves.

In the next step S73, each zone ECU 2 performs a blinking-timing information sharing process of sharing blinking timing information of the turn light L controlled by each ECU 2. In this sharing process, the blinking timing information can be shared with each other without the central processing unit 10 interposed therebetween, or the blinking timing information can be shared with each other with the central processing unit 10 interposed as a hub device. Note that, as described above, the transmission and reception of information via the local network of the present disclosure also includes a case where information is transmitted and received between the zone ECUs 2 with the central processing unit 10 interposed as a hub device, that is, by using the central processing unit 10 as a hub device without the processing of the central processing unit 10 interposed therebetween.

In the next step S74, the zone ECUs 2 compare the blinking timing of the turn light L of another zone ECU 2 with the blinking timing of the turn light L of the own ECU 2, and perform an adjustment process of adjusting the blinking timing of the turn light L of the own ECU. The method of adjusting the blinking timing is only required to be able to adjust the blinking timing, and a specific method is not particularly limited.

Figure 9:
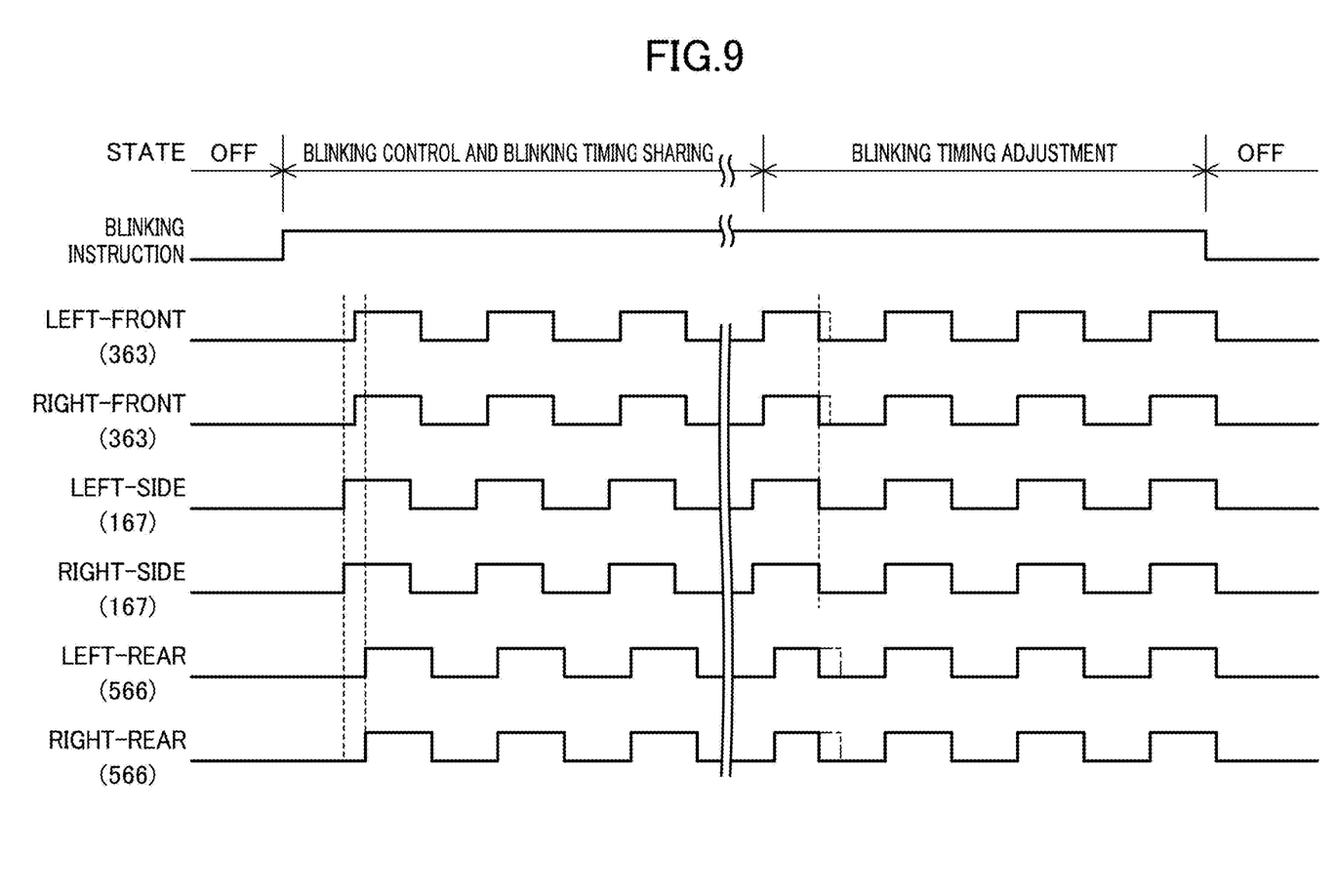
FIG. 9 is a timing chart illustrating an example of the blinking control of the turn lights according to the second embodiment.

FIG. 9 illustrates an example of a method of adjusting a blinking timing. In the example of FIG. 9, the blinking timing of the left-side turn light L1 and the blinking timing of the right-side turn light L2 are substantially the same, and their blinking start time is the earliest. Next, the left-front turn light L3 and the right-front turn light L4 start blinking substantially simultaneously, and finally, the left-rear turn light L5 and the right-rear turn light L6 start blinking substantially simultaneously.

The process in step S74 is performed during a "timing adjustment" period in FIG. 9. Specifically, the zone ECUs 2 compare the blinking timing of the turn light L of another zone ECU 2 with the blinking timing of the turn light L of the own ECU 2, and execute control to advance a turn-off time in accordance with the earliest blinking timing. As a result, the turn-off times of the respective turn lights L can be the same. Furthermore, the pitch of turning on and off the turn light L can be set in advance. Consequently, in a case where the turn-off time is advanced, each zone ECU 2 can repeat turning on and off the turn light L at a predetermined pitch by setting the turn-off time as a starting point. As a result, the turn-on and turn-off times of the turn lights L can be the same, that is, the blinking timings can match.

Thereafter, when a blinking end instruction is transmitted as a blinking control signal from the central processing unit 10 to each zone ECU 2 in step S67, each zone ECU 2 ends blinking of the turn light (step S66).

In the above description, "timing adjustment" is the control to advance the turn-off time in accordance with the earliest blinking timing, but the present invention is not limited thereto. For example, the zone ECU or the smart actuator that outputs a blinking control signal at the timing farthest from a reference timing can adjust the output timing to the reference timing. The reference timing can be set in advance, or can be obtained by calculation, for example, like an average value of timing information received from each zone ECU.

—Blinking Control of Turn Light (2)—

Figure 10:
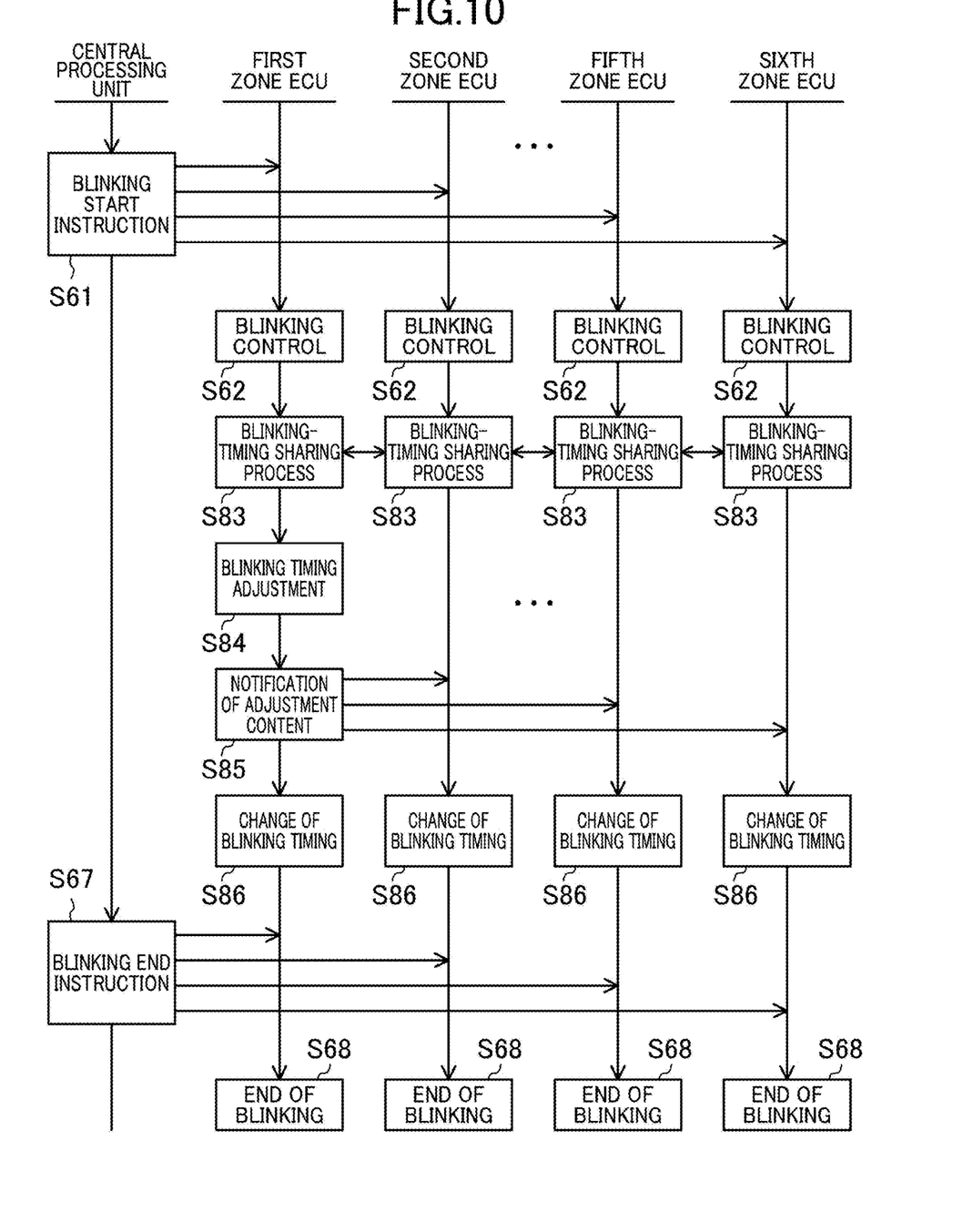
FIG. 10 is a flowchart illustrating another example of the blinking control of the turn lights according to the second embodiment.

FIG. 10 illustrates another example of the blinking control operation of a turn light in the vehicle control system described in the second embodiment. Note that, in FIG. 10, the same operations as those in FIG. 8 are denoted by the same reference signs, and the description thereof may be omitted.

In FIG. 10, the method of adjusting the blinking timing of the turn light L is different from that in the case of the blinking control operation of FIG. 8. Specifically, in the example of FIG. 10, as the blinking-timing sharing process performed at the time of the blinking control, the blinking timing of each zone ECU 2 is collected in a master ECU (the first zone ECU 21 in FIG. 10) that is any one of the first to sixth zone ECUs 21 to 26 (step S83). Then, in the next step S84, the master ECU performs arithmetic processing for adjusting the blinking timing of each turn light L on the basis of the timing information of each zone ECU 2. Thereafter, in step S84, the master ECU transmits an adjustment signal for adjusting the timing of each turn light L to each zone ECU 2 on the basis of the result of the arithmetic processing.

In step S86, each zone ECU 2 outputs a blinking control signal whose blinking timing has been adjusted to the turn light on the basis of the timing adjustment signal received from the master ECU.

Thereafter, when a blinking end instruction is transmitted as a blinking control signal from the central processing unit 10 to each zone ECU 2 in step S67, each zone ECU 2 ends blinking of the turn light (step S68).

As described above, in the present embodiment, for each of the turn lights L1 to L6, the blinking control operation itself is incorporated in the central processing unit 10, but fine timing adjustment is handled on the zone ECU side. As a result, it is possible to implement function distribution between the central processing unit and the zone ECU 2 while the main function is incorporated in the central processing unit 10.

Although the first and second embodiments have described the control of the turn light, the technology of the present disclosure can also be applied to the synchronous control of an actuator other than the turn light L. For example, in a case where sound generation devices that emit a buzzer sound or the like are distributed in the vehicle 1, the smart actuator (for example, see 163, 561 in FIG. 1) that drives the sound generation device can adopt the same control as that of the turn light described above. Specifically, when describing using the second embodiment, since the first zone ECU 21 and the second zone ECU 22 are connected via the local network, the first zone ECU 21 and the second zone ECU 22 share the drive timing information of the actuator 163 via the local network. In the first zone ECU 21, the timing signal of the actuator 163 in the first zone ECU 21 is adjusted on the basis of the shared information. Similarly, in the first zone ECU 21, the timing signal of the actuator 163 in the second zone ECU 21 is adjusted on the basis of the shared information. As described above, either the first zone ECU 21 or the second zone ECU 22 can be used as the master ECU.

Note that the technology disclosed herein is not limited to the embodiments described above, and various changes and substitutions can be made without departing from the gist of the claims. In addition, the embodiments described above are merely examples, and the scope of the present disclosure should not be interpreted in a limited manner. The scope of the present disclosure is defined by the claims, and all modifications and changes falling within the equivalent scope of the claims are within the scope of the present disclosure.

INDUSTRIAL APPLICABILITY

The technology disclosed herein is useful for designing a vehicle control system.

The invention claimed is:
1. A vehicle control system comprising:
a plurality of zone ECUs each of which is disposed in each predetermined zone of a vehicle; and
a central processing unit that integrally controls the zone ECUs, wherein
the zone ECUs include a plurality of first zone ECUs that each output a blinking timing signal for blinking a corresponding one of blinkers installed in the vehicle on a basis of a blinking control signal received from the central processing unit,
the central processing unit and each of the first zone ECUs are connected by a time synchronization network, whereas each of the first zone ECUs and the corresponding one of the blinkers are connected by a time asynchronous network, the first zone ECUs are configured to be connected to each other-via a local network, share blinking timing information of the blinkers with one another via the local network, and adjust the blinking timing signal on a basis of the blinking timing information that is shared, and each of the first zone ECUs is configured in a manner that in a case where blinking timing of another first zone ECU is earlier than its own blinking timing, a turn-off start time during a blinking period is made to match a turn-off start time of the another first zone ECU.

2. The vehicle control system according to claim 1, wherein each of at least a subset of the first zone ECUs outputs a timing signal for operating a corresponding one of actuators installed in the vehicle on a basis of a control signal received from the central processing unit, each of the subset of the first zone ECUs and the corresponding one of the actuators are connected by a time asynchronous network, and the subset of the first zone ECUs share drive timing information of the actuators with one another via the local network, and adjust the timing signal on a basis of the drive timing information that is shared.

* * * * *